3,479,152
CHELOMETRIC ZINC TITRATION
Charles J. Overbeck and James J. Hickey, Chicago, Ill., assignors to Nalco Chemical Company, Chicago, Ill., a corporation of Delaware
No Drawing. Filed Sept. 3, 1965, Ser. No. 485,121
Int. Cl. C09k *3/00;* G01n *33/20, 31/16*
U.S. Cl. 23—230                          4 Claims

ABSTRACT OF THE DISCLOSURE

Analysis for small amounts of zinc in waters which also contain high hardness levels may be made by using as a titrant diethylenetriaminopentaacetic acid and a dithizone indicator.

---

This invention relates to a novel analytical method whereby the concentration of zinc is determined in water supplies having an amount of zinc dissolved therein ranging from 0.1 p.p.m. to greater than 10 p.p.m., said means consisting of a chelometric titration of the zinc-containing water with dithizone as an indicator and a solution of diethylenetriaminopentaacetic acid as a titrant.

Zinc is present in a wide variety of waters. The United States Public Health Survey of 1962 reported that zinc is found in most finished water supplies in the range of approximately 0.3 to 7 p.p.m. Oftentimes, zinc is found in industrial water systems due to the corrosion of galvanized iron and brass which is in contact with the water. Also, zinc is used as a corrosion inhibitor in recirculating water systems such as cooling towers, and the like, therefore necessitating the determination of the zinc concentration in these systems to maintain proper inhibitor control by keeping zinc concentration at the desired treatment level. Further, it is necessary to determine zinc concentrations in waters which are discharged to natural rivers and streams to avoid pollution, thereby ascertaining that zinc concentrations remain below the acceptable maximum amount of about 7 p.p.m.

A number of methods for determining zinc in water have been proposed. The singular drawback which all these methods possess is the necessity of one or more tedious extraction steps due to the interference of other metals. Particularly difficult to analyze are those waters which contain hardness in amounts ranging from 20 p.p.m. to as high as 1000 p.p.m. Yet, waters containing high amounts of hardness, calculated as $CaCO_3$, are found throughout the country, thereby emphasizing the great need for a simple, efficient, accurate analytical test for zinc ions which is not deleteriously affected by said hardness.

It is therefore an object of this invention to provide a simple test method for quantitatively analyzing the zinc concentration of water which contains both zinc and at least 20 p.p.m. hardness, calculated as $CaCO_3$.

It is a particular object of this invention to provide an analytical method for determining zinc concentrations in water whereby dithizone is used as an indicator and diethylenetriaminopentaacetic acid is used as a titrant. Other objects will appear hereinafter.

Accordingly, a new analytical method for quantitatively determining the amount of zinc in water, particularly useful in the presence of high amounts of hardness, has now been discovered. The novel method or procedure is simple, accurate and easy to use in field operations by operators of municipal or industrial plants.

In its broadest aspects, the process of the invention having for its aim the quantitative analysis of zinc comprises titrating with diethylenetriaminopentaacetic acid a buffered solution having a pH range of 3.5–6.0 and containing zinc and dithizone indicator until a color change from pink to blue-green is noted.

It has been found that a wide variety of water supplies may be analyzed by the method of this invention, provided that the zinc concentration is at least 0.1 p.p.m. The amount of calcium which may be present without deleteriously affecting the accuracy of the procedure may be as high as 1000 p.p.m. expressed as $CaCO_3$. Of course, normal water supplies contain other elements which may interfere with zinc determination accuracy. Presented below in Table I are examples of a number of ions which may be present in water supplies without affecting the instantly described determination. Also presented in Table I are the recommended maximum tolerable amounts below which the accuracy of this novel procedure will not be affected.

If it is suspected that ions not mentioned in Table I may be present, it is a preferred practice to determine the amount of these ions which may be present by standard analytical means, and, thereafter determine the maximum tolerable amount which will not deleteriously affect the accuracy of the method of this invention. Normally, however, the analyst will find that interference by ions present in most waters other than those listed below will be insignificant.

TABLE I.—EFFECT OF IONS ON ZINC TITRATION ACCURACY

| Ion present: | Recommended allowable Concentration, p.p.m. |
|---|---|
| Antimony | 10.0 |
| Arsenic | 10.0 |
| Barium | 200 |
| Boron | 100 |
| Copper | 0.5–1.0 |
| Fluoride | 50 |
| Molybdenum | 10 |
| Silver | 1.0 |
| Tin | 10 |
| Vanadium | 0.5 |
| Carbonate | 1,000 |
| Phosphate | 5,000 |
| Sulphate | 10,000 |
| Chloride | 5,000 |
| Nitrate | 1,000 |
| Nitrite | 50 |
| Fluorine | 500 |

It is to be particualrly pointed out that water supplies do not normally contain the maximum tolerable amount of most ions as set forth in Table I above. For example, a survey conducted by the United States Public Health Service has found that the highest amount of barium present in finished water supplies is approximately 0.9 p.p.m. Similarly, 10 p.p.m. of fluoride is the maximum concentration normally found, and 0.07 p.p.m. is the maximum amount of vanadium in finished water supplies These maximum amounts found are substantially less than the amount which might adversely affect the accuracy of the method of this invention.

Specifically, the novel method or procedure of this invention consists of the following steps. The first step of the process is to simply measure a volume of water which is to be tested and which contains at least .01 mg. of zinc and transfer that measured volume of water to a beaker or other vessel.

It has been found that it is necessary to buffer the water to be analyzed within a specific pH range in order to achieve most accurate results. The pH must be higher than about 3.5 in order to insure that other ions in solution will not interfere with the determination of zinc. Also, the pH must be below about 6.0 to insure that the indicator used herein will properly chelate or react with the zinc ions. It has been found that accurate titrations may be made anywhere within a pH range of 3.5 to 6.0, with a preferred pH range of 4.0 to 5.0.

The choice of the buffering agent may be made from any of the standard buffer solutions which are currently used in the analytical analysis art. One particularly suitable buffering solution which buffers the water to be analyzed at a prefered pH of approximately 4.5 may be made as follows: 270 grams of sodium acetate trihydrate and 225 ml. of glacial acetic acid diluted with deionized water to a volume of one liter. Only minor amounts of the buffer solution are necessary, usually less than about 10 ml.

Once the sample to be analyzed has been buffered, the next step in the procedure is to add a sufficient amount of dithizone to said sample volume to cause a visible pink color. The use of dithizone in the water sample requires prior dissolution of this indicator in solvents such as methyl or ethyl alcohol. Only minor amounts of the indicator are necessary, and the indicator solution should be added with stirring in small increments of say about ½ ml. to prevent the addition of excess indicator. A typical indicator solution which may be prepared may comprise approximately 0.4% dithizone dissolved in methanol. The particular solvent and/or concentration of the solution of indicator may be varied according to th wishes of the analyst, but the above described solution has been found to be highly suitable for use in this invention.

Once a pink color has been formed in the sample being analyzed, the next step in the procedure involves titrating said sample with a titrant until an end point is indicated by a change from pink color to a blue-green or gray-green color. The titrant used in the method of this invention comprises an aqueous solution of diethylenetriaminopentaacetic acid, hereinafter called DTPA. The titrating solution may be prepared by dissolving an exactly weighed amount of DTPA in the acid form in water. Likewise, a salt form of DTPA may be prepared such as by preparation of acid solution followed by the addition of an amount of sodium hydroxide or other base material such as alkali hydroxides and ammonia to form the acetate. These solutions are then diluted to an exact volume, thereby fixing the concentration of the titrant. A particularly preferred titrating solution may be formed as follows. Exactly 0.6011 grams of DTPA (acid) plus 8.5 ml. of 1 N sodium hydroxide are mixed and diluted to 1000 ml. with deionized water. The particularly preferred amount of DTPA set forth above has been discovered to facilitate the calculations which are necessary to determine the exact zinc concentration as set forth below.

The final step in the procedure of this invention is to calculate the zinc concentration in said water sample according to the formula:

$$C_1 = \frac{C_2 V_2}{6.011 \, V_1}$$

In the above formula, $C_1$ is the zinc concentration and $C_2$ is the DTPA concentration. It is, of course, essential that the units for the concentration of both materials be the same. Preferred dimensions for expressing concentration are milligrams per milliliter or parts per million (p.p.m.). Likewise, the volumes should be measured in similar dimensions, such as milliliters, liters, or the like. $V_1$ is the measured volume of water being analyzed, and $V_2$ is the measured volume of the titrant necessary to reach the end-point.

The mechanism by which the titration is effected is via a chelating reaction between the DTPA and the zinc. It has been found that based on a mole for mole reaction for every one milligram of zinc present, 6.011 milligrams of DTPA are required for chelation. Therefore, the number of milligrams of DTPA added during titration will equal 6.011 times the number of milligrams of zinc present in the sample. The number of milligrams of zinc present may also be expressed as a product of the concentration of the zinc times the volume of the zinc solution, that is, $V_1 C_1$. Similarly, the number of milligrams of DTPA present may be expressed as $V_2 C_2$. Therefore, 6.011 times $V_1 C_1 = V_2 C_2$. Therefore, in solving for the unknown concentration of zinc, $C_1$, the formula set forth above is used.

As mentioned hereinabove, a particularly preferred concentration of DTPA in water is 0.6011 gram per thousand milliliters of water. When this concentration, 0.6011 milligram per ml., is substituted in the above formula, it can be readily seen that a sample of 100 ml. of water will require 1 ml. of titrant for every 0.1 mg. of zinc present in the 100 ml. sample. Therefore, the amount of zinc present in the sample can be easily determined merely by multiplying the number of milliliters of titrant by 0.1, thereby facilitating ready calculation.

The following examples are presented to illustrate the efficacy of the invention.

EXAMPLE I

Exactly 100 ml. of a sample containing an unknown amount of zinc ion and further containing 20 p.p.m. hardness, calculated as $CaCO_3$, was poured into a 250 ml. beaker, fitted with a mixing device. To this sample, 5 ml. of the buffer solution described above was added, thereby adjusting the pH to 4.5. To the buffered solution, 0.5 ml. increments of the indicator solution described above containing dithizone were added with stirring until the solution remained visibly pink. At this point, the pink solution was titrated with a titrant comprising the above described DTPA solution containing 0.6011 gram of DTPA per liter until the end-point of the titration was shown by a change in the color of the sample from pink to blue-green. Substituting in the above set forth formula the values for the volume of titrant, namely, 2.2 ml., it was found that the sample contained 0.22 mg. of zinc, thereby showing a concentration in the water sample of 2.2 mg. per liter.

EXAMPLE II

A number of zinc-containing water supplies were prepared synthetically to determine the effect of hardness upon the accuracy of the titration. The procedure as shown in Example I above was used to determine zinc concentration which in each test sample was prepared as a 2.2 mg./liter concentration. As can be seen from the table presented below, even as much as 1000 p.p.m. of hardness does not affect the accuracy of the titration.

TABLE II.—EFFECT OF HARDNESS ON ZINC TITRATION

| P.p.m. hardness, as $CaCO_3$ | Zinc determined, mg./liter |
| --- | --- |
| 0 | 2.2 |
| 50 | 2.2 |
| 500 | 2.2 |
| 1000 | 2.2 |

Having thus described our invention, we claim:

1. A method for the quantitative analysis of zinc in a water which also contains at least 20 p.p.m. hardness, calculated as $CaCO_3$, which comprises titrating with diethylenetriaminopentaacetic acid a buffered solution of such water having a pH range of 3.5–6.0 and containing said zinc and dithizone indicator until a color change of pink to blue-green is noted.

2. A method for quantitatively analyzing the zinc concentration of water which contains zinc and at least 20 p.p.m. hardness, calculated as $CaCO_3$, said method comprising measuring a volume of water, buffering said volume of water at a pH ranging from 3.5 to 6.0, adding a sufficient amount of a solution dithizone to said buffered volume of water to cause a visible pink color, titrating said pink buffered volume of water by adding slowly thereto a titrant comprising an aqueous solution of diethylenetriaminopentaacetic acid in an amount sufficient to change said pink color to a blue-green color, measuring said volume of titrant solution, and calculating the zinc concentration in said water according to the formula:

$$C_1 = \frac{C_2 V_2}{6.011\ V_1}$$

where $C_1$ is the zinc concentration,
$C_2$ is the titrant concentration,
$V_1$ is the measured volume of water being analyzed, and
$V_2$ is the measured volume of titrant.

3. The method of claim 1 where the measured volume of water is buffered at a pH ranging from 4.0 to 5.0.

4. The method of claim 1 where said water being analyzed contains from 50 to 1000 p.p.m. hardness.

References Cited
UNITED STATES PATENTS 2,583,890  1/1952  Schwarzenbach _____ 23—230

OTHER REFERENCES

Andereg, G., Chemical Abstracts, p. 16780, vol. 53 (1959).

MORRIS O. WOLK, Primary Examiner

ELLIOTT A. KATZ, Assistant Examiner

U.S. Cl. X.R.

252—408